United States Patent [19]
Nagata

[11] Patent Number: 5,596,965
[45] Date of Patent: Jan. 28, 1997

[54] CYLINDER HEAD FOR AN INTERNAL COMBUSTION ENGINE

[75] Inventor: Masahisa Nagata, Toyota, Japan

[73] Assignee: Toyota Jidosha Kabushiki Kaisha, Toyota, Japan

[21] Appl. No.: 590,425

[22] Filed: Jan. 24, 1996

[30] Foreign Application Priority Data

Jan. 24, 1995 [JP] Japan ..................... 7-009293

[51] Int. Cl.$^6$ .............. F01L 3/20; F02B 31/00; F02F 1/00
[52] U.S. Cl. ........................................... 123/308
[58] Field of Search ................. 123/193.5, 193.3, 123/306, 308

[56] References Cited

U.S. PATENT DOCUMENTS

| 4,354,463 | 10/1982 | Otani et al. |         |
|-----------|---------|--------------|---------|
| 5,138,989 | 8/1992  | Fraidl       | 123/308 |
| 5,230,310 | 7/1993  | Hashimoto.   |         |
| 5,335,634 | 8/1994  | Hashimoto et al. | 123/308 |
| 5,408,958 | 4/1995  | Esch et al.  | 123/308 |

FOREIGN PATENT DOCUMENTS

| 0433561    | 6/1991  | European Pat. Off. . |
|------------|---------|---------------------|
| 1520353    | 3/1968  | France .            |
| 2853576    | 7/1979  | Germany .           |
| 56-148616  | 11/1956 | Japan .             |

*Primary Examiner*—Marguerite McMahon
*Attorney, Agent, or Firm*—Cushman, Darby & Cushman

[57] ABSTRACT

A cylinder head includes a first intake port for generating a swirl flow in a cylinder and a second intake port for causing a part of intake air to flow into the cylinder in a direction opposite to the swirl flow. The second intake port has a wall at a downstream end thereof, extending below a corresponding intake valve. A portion of the wall adjacent to an exhaust port has a lower or downstream end which is preferably substantially perpendicular to a lower surface of the cylinder head. Accordingly, the intake air flow passing through the second intake port is directed downwardly. Therefore, the swirl flow generated in the cylinder is less likely to be weakened by opposing flows.

6 Claims, 3 Drawing Sheets

CYLINDER HEAD FOR AN INTERNAL COMBUSTION ENGINE

BACKGROUND OF THE INVENTION

1. Field of the Invention

The present invention relates to a cylinder head for an internal combustion engine, and, more particularly, relates to the structure of a lower end of an intake port formed in the cylinder head.

2. Description of Related Art

In an internal combustion engine having two intake ports per cylinder, as illustrated in FIG. 4, one intake port 21 generates a swirl flow 23 in a cylinder 24 and the other intake port 22 causes a part of intake air to flow into the cylinder 24 in a direction 29 opposite to the swirl flow 23. This inhibits the generation of a strong swirl flow in the cylinder 24.

To weaken the swirl-opposing flow from intake port 22 to thereby improve a swirl ratio, Japanese Patent Publication No. SHO 56-148616 discloses an intake valve 26 provided with a shroud 25, as shown in FIG. 5.

The intake valve 26 is inclined from a direction perpendicular to a lower surface 30 of the cylinder head 27, as shown in FIG. 6. As a result, a dead volume 28 (a triangular portion (in cross-section) surrounded by lines A'B', B'C', and C'A') is defined between an extension of the lower surface 30 of the cylinder head 27 and a lower surface 26a of the intake valve 26.

However, the internal combustion engine having a plurality of intake ports and using the inclined intake valve having a shroud has the following problems.

First, by providing a shroud, the number of constituent parts increases. Further, to prevent the intake valve from rotating about its axis, resulting in dislocation of the shroud from its intended position, it is necessary to provide an additional valve rotation preventing device. Both of these factors increase the cost of manufacture.

Second, the dead volume caused because of inclination of the intake valve lowers the compression ratio of the engine and thereby reduces the engine power.

SUMMARY OF THE INVENTION

An object of the present invention is to provide a cylinder head for an internal combustion engine which can improve a swirl ratio without increasing the number of constituent parts, and which can decrease a dead volume caused by an inclined intake valve.

A cylinder head for an internal combustion engine according to the present invention has at least one first intake port for generating a swirl flow in a cylinder and at least one second intake port for causing at least a part of intake air to flow into the cylinder in a direction opposite to the swirl flow. The second intake port has a wall portion extending below a lower surface of-an intake valve installed in the second intake port. A portion of the wall portion on the side close to an exhaust port has a lower end which is preferably substantially perpendicular to the lower surface of the cylinder head.

In the above-described cylinder head, at least a part of intake air passing through the second intake port collides with the portion of the wall substantially perpendicular to the lower surface of the cylinder head, so as to be directed downwardly. It is therefore unlikely to weaken the swirl flow produced in the cylinder and thus improves the swirl ratio. This is achieved without providing a shroud or the like on the intake valve and, accordingly, any device for preventing valve rotation.

Further, according to the present invention, the dead volume between the lower surface of the intake valve and an extension of the lower surface of the cylinder head is reduced, compared with the dead volume with the conventional, obliquely extending wall, so that the engine power is improved.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENT

Figure 1:
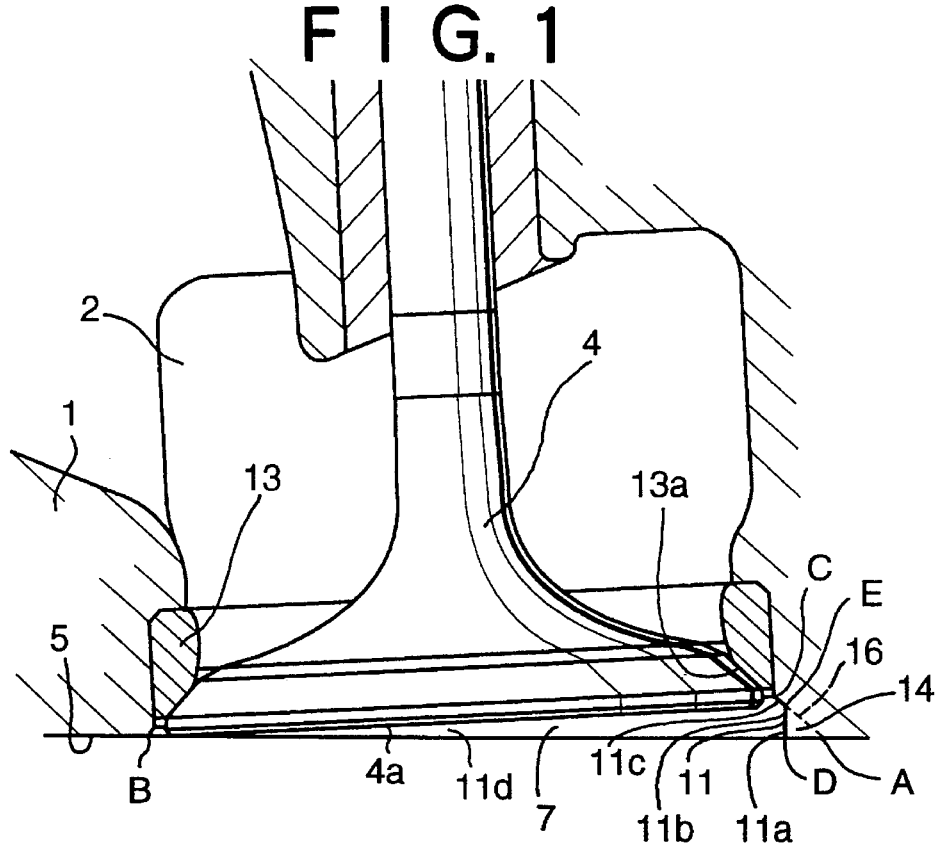
FIG. 1 is a cross-sectional view of a portion of a cylinder head for an internal combustion engine in accordance with a first embodiment and a third embodiment of the present invention, taken along line 1—1 of FIG. 3.

Three embodiments of the present invention will be explained with reference to FIGS. 1–3. Structures common to all of the embodiments of the present invention are denoted with the same reference numerals throughout the description of the embodiments.

First, structures common to all of the embodiments of the present invention will be explained with reference to, for example, FIG. 1. In FIG. 1, a cylinder head 1 for an internal combustion engine includes a plurality of (for example, two) intake ports 2 and 3 and at least one (for example, two) exhaust ports 9 and 10 per cylinder. The plurality of intake ports includes at least one (for example, one) port 3 for generating a swirl flow 6 in a cylinder 15 and at least one (for example, one) port 2 for causing at least a part of intake air to flow into the cylinder 15 in a direction 8 opposite to the swirl flow 6. The swirl generation port 3 may be a port which can generate a swirl by itself or a port which opens tangentially to the cylinder. The port 2 may be a swirl generation port or a straight port (a non-swirl port). An intake valve 4 mounted in each port 2, 3 has an axis which is inclined from a direction perpendicular to a lower surface 5 of the cylinder head 1.

Because the intake valve 4 is inclined, a dead volume 7 having a substantially triangular cross section (a portion surrounded by lines AB, BC, and CA) is defined between a lower surface 4a of the intake valve 4 and an extension of the lower surface 5 of the cylinder head 1.

The second intake port 2 has a wall 11 at a downstream end of the intake port 2, extending below the lower surface 4a of the intake valve 4. A portion of the wall 11 on a side close to an adjacent exhaust port 10 includes a lower (or downstream) end 11a, an upper (or upstream) end 11c, and an intermediate portion 11b between the lower end 11a and the upper end 11c. The lower end 11a is substantially perpendicular to the lower surface 5 of the cylinder head 1. The upper end 11c of the wall 11 is tangentially connected to a tapered inside surface 13a of a lower portion of valve seat 13 fitted to the intake port 2. The lower end 11a and the intermediate portion 11b of the wall 11 are located radially inward of a downward projected extension (shown by a broken line 16 which is also equal to a configuration of an intake port of the conventional cylinder head) of the upper end 11c of the wall 11.

Next, structures unique to each embodiment of the present invention will be explained.

In the first embodiment of the present invention, as illustrated in FIG. 1, the intermediate portion 11b of the portion of the wall 11 on the side close to the adjacent exhaust port 10 extends straight from the lower end 11a to the upper end 11c. Intermediate portion 11b extends in a direction substantially perpendicular to the lower surface 5 of the cylinder head 1.

Figure 2:
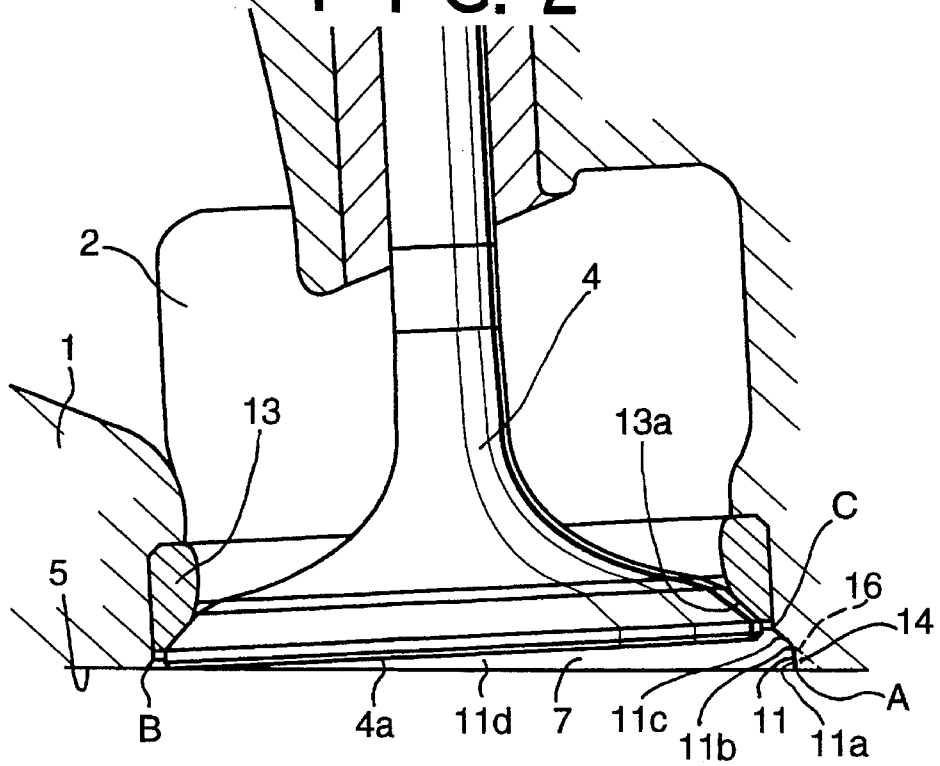
FIG. 2 is a cross-sectional view of a portion of a cylinder head in an internal combustion engine in accordance with a second embodiment and a third embodiment of the present invention.
Figure 3:
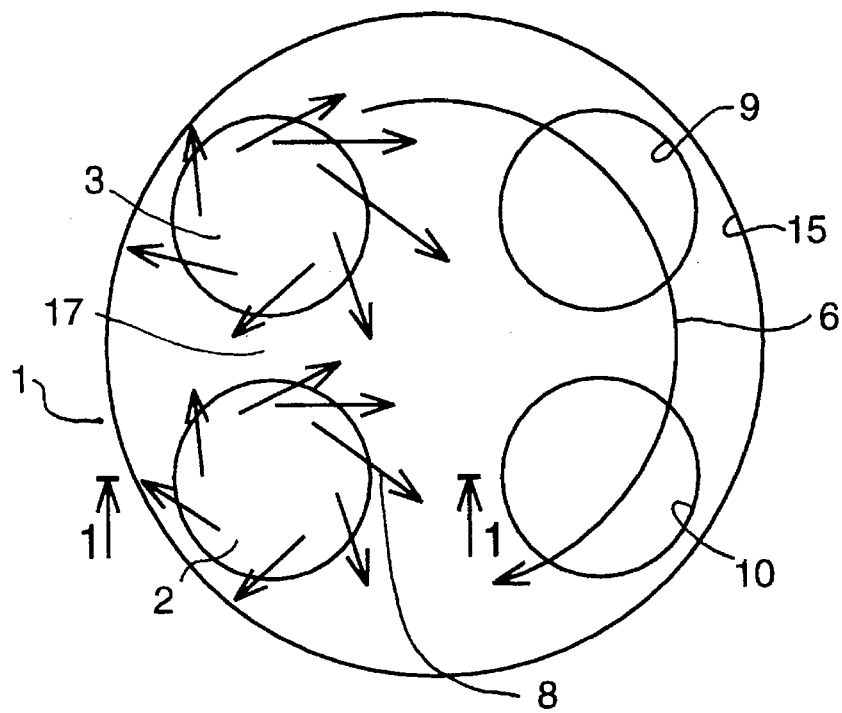
FIG. 3 is a plan view of a cylinder portion of the engine of FIG. 1 and FIG. 2.
Figure 4:
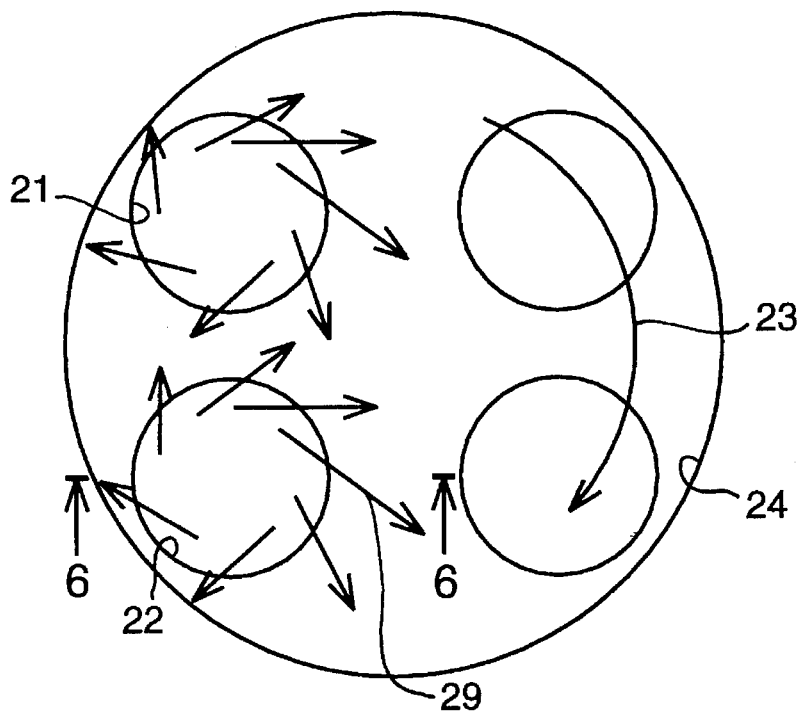
FIG. 4 is a plan view of a cylinder portion of a conventional engine.
Figure 5:
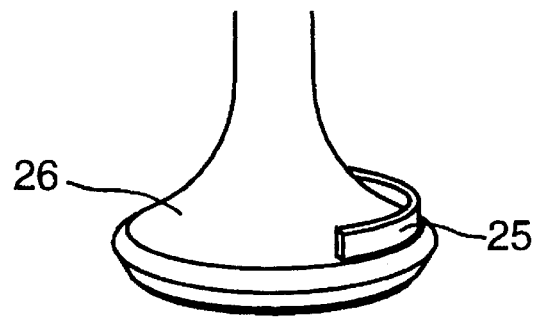
FIG. 5 is a partial perspective view of a conventional intake valve having a shroud.
Figure 6:
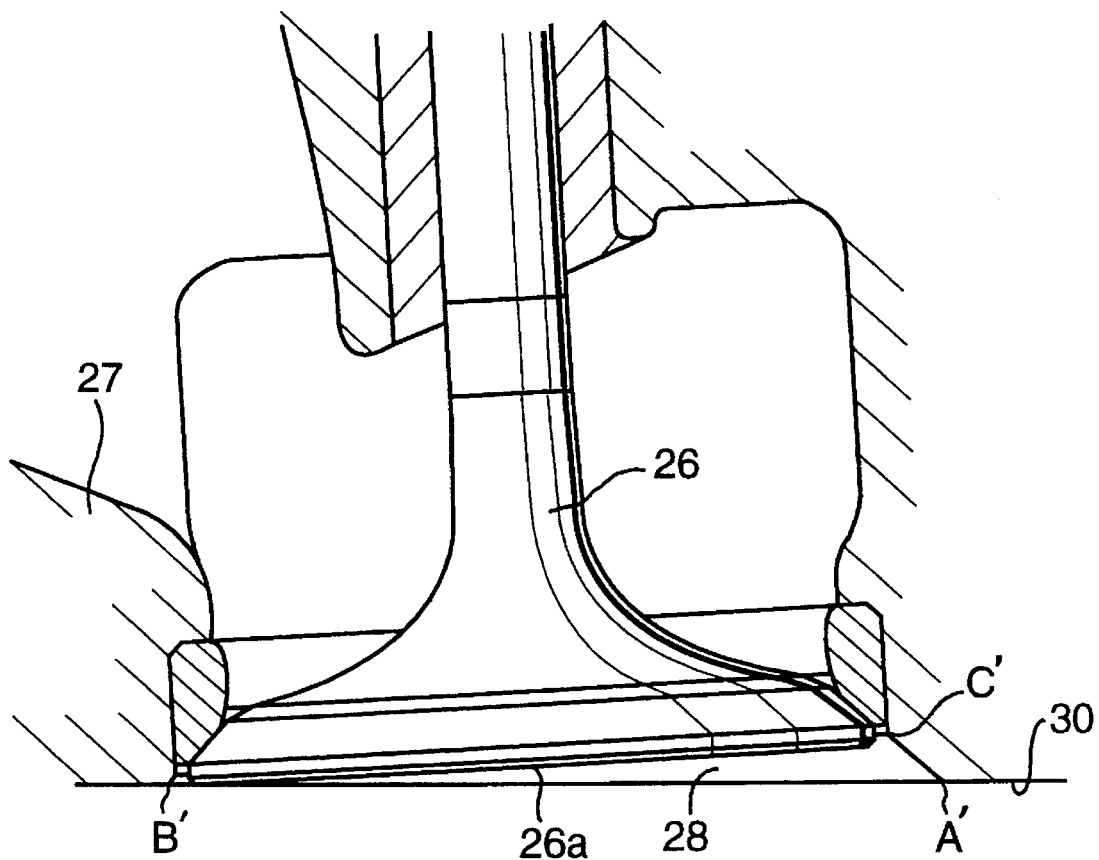
FIG. 6 is a cross-sectional view of a portion of a cylinder head in a conventional internal combustion engine, taken along line 6—6 of FIG. 4.

In the second embodiment of the present invention, as illustrated in FIG. 2, the intermediate portion 11b on the side close to the adjacent exhaust port 10 curvedly extends from the lower end 11a to the upper end 11c. The intermediate portion 11b is tangentially connected to the upper end 11c and the lower end 11a at opposite ends of the intermediate portion 11b.

In the third embodiment of the present invention, as illustrated in FIGS. 1 and 2, the wall 11 of the second intake port 2 also has a second portion 11d on a side close to the first intake port (swirl generation port) 3. At least a lower end of the second portion 11d is substantially perpendicular to the lower surface 5 of the cylinder head 1. An intermediate portion and an upper end of the second portion 11d of the wall 11 may also be substantially perpendicular to the lower surface 5 of the cylinder head 1.

Operation and advantages of the cylinder head having the above-described structures will now be explained.

Certain operation features and advantages are common to all of the embodiments of the present invention. When a piston (not shown) moves downwardly in the cylinder 15, intake air is introduced through the first and second intake ports 2 and 3 into the cylinder 15. The first intake port 3 generates a swirl flow 6 in the cylinder 15. The second intake port 2 causes at least a part of the intake air to flow into the cylinder 15 in a direction 8 generally opposite to the swirl flow 6. When intake air passes through the second intake port 2, at least a part of intake air collides with the lower end 11a and the intermediate portion 11b of the wall 11, so that the flow direction is changed downwardly. As a result, the component of the intake air flow opposite to the swirl flow 6 decreases in strength. Therefore, the swirl flow 6 is not as weakened when the flow comes into the cylinder 15 from second intake port 2. This improves the swirl ratio, which in turn promotes fuel atomizing and fuel and air mixing to thereby improve combustion and fuel economy.

Further, because at least the lower end 11a of the wall 11 is substantially perpendicular to the lower surface of the cylinder head 1, the dead volume 7 between the lower surface 4a of the intake valve 4 and the lateral extension of the lower surface 5 of the cylinder head 1 is decreased by the volume surrounded by lines AD, DE, and EA (see FIG. 1, for example). As a result, the compression ratio of the engine is increased so that the engine power is improved.

Operation and advantages unique to each embodiment of the present invention will be explained.

In the first embodiment of the present invention, because both the lower end 11a and the intermediate portion 11b of the wall 11 are substantially perpendicular to the lower surface 5 of the cylinder head 1, the resultant vertical wall portion is made relatively long. Therefore, the direction of intake air flow is effectively changed downwardly.

In the second embodiment of the present invention, because the intermediate portion 11b of the wall 11 is curved, the direction of intake air flow is gradually changed so that the pressure loss in the intake air passing through the end of the second port 2 is small. Engine power is therefore increased.

In the third embodiment of the present invention, because the second portion 11d of the wall 11 includes a lower end substantially perpendicular to the lower surface 5 of the cylinder head 1, the intake air flow introduced through the second intake port 2 toward a portion 17 of the cylinder between the first intake port 3 and the second intake port 2 is directed downwardly. Therefore, the dissipative collision of the intake air flow from the first intake port 3 and the intake air flow from the second intake port 2 at the portion 17 of the cylinder is weakened. The swirl ratio is accordingly further improved.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A cylinder head for an internal combustion engine having at least one cylinder, comprising:

a plurality of intake ports and at least one exhaust port associated with each said at least one cylinder, said plurality of intake ports and said at least one exhaust port each defining openings which open onto a surface of the cylinder head, wherein a first said intake port is constructed and arranged to generate a swirl flow in said at least one cylinder, and a second said intake port is constructed and arranged to generate a flow within said at least one cylinder in a direction opposing said swirl flow generated by said first intake port; and an intake valve operably associated with said second intake port, wherein said intake valve is constructed and arranged within said second intake port to define a wall portion of only said second intake port extending in a downstream direction away from said intake valve, said wall portion comprising an upstream part, a downstream part, and an intermediate part therebetween, wherein at least some of said downstream part of said wall portion adjacent to said at least one exhaust port is radially inside a projection of said upstream part of said wall portion, said projection extending in a substantially downstream direction.

2. A cylinder head according to claim 1, wherein at least some of said downstream part of said wall portion is substantially perpendicular to said surface of the cylinder head.

3. A cylinder head according to claim 1, wherein said plurality of intake ports consists of one said first intake port and one said second intake port.

4. A cylinder head according to claim 1, wherein at least some of said wall portion is curvingly continuous between said upstream and downstream parts thereof.

5. A cylinder head according to claim 1, wherein at least some of said downstream part of said wall portion close to said first intake port is substantially perpendicular to said surface of the cylinder head.

6. A cylinder head according to claim 1, wherein said intake valve operably associated with said second intake port has a downstream-facing surface and is actuable along a direction which is at an angle to a direction perpendicular to said surface of the cylinder head.

\* \* \* \* \*